3,187,039
METHOD FOR CHANGING THE CRYSTAL HABIT OF MONOSODIUM GLUTAMATE
John A. Frump and Archie P. Miller, Terre Haute, Ind., assignors to Commercial Solvents Corporation, a corporation of Maryland
No Drawing. Filed Oct. 19, 1962, Ser. No. 231,859
11 Claims. (Cl. 260—534)

This invention relates to a method for changing the crystal habit of monosodium glutamate (MSG).

MSG, an amino-acid salt, is of importance as a flavor enhancing material for foods and is frequently mixed with other food ingredients in dry, powdered form. Ordinarily this product is derived from plant materials by hydrolysis, fermentation, etc., in the form of an aqueous solution from which the crystalline salt is recovered by causing the solution to be supersaturated, as by removal of water or lowering of the temperature. As conventionally recovered from the substantially pure solution of monosodium glutamate, however, the MSG crystals are needle-like, that is, they have a length-to-diameter ($L/D$) ratio of about 10/1 to 15/1. This is often not a desirable shape for forming dry mixtures of nonseparating characteristics.

In this invention, it was surprisingly found that by incorporating a small amount of calcium in the MSG solution before crystallization, MSG crystals having an $L/D$ ratio less than 10/1 can be obtained. This is particularly surprising since magnesium, an alkaline earth metal like calcium, was found to be unsatisfactory in this respect.

The calcium is incorporated, e.g. by adding, in the MSG solution in amounts sufficient to give the desired $L/D$ ratio in the crystals. The monosodium glutamate crystals desired from such a solution are short and stout, having an $L/D$ ratio smaller than about 10/1, for instance an $L/D$ ratio less than about 8/1, preferably about 1/1 to 4/1. Generally, at least about 0.01 to 2 percent or more of calcium, preferably about 0.03 to 1.5 percent, based on dry MSG in the solution, is provided in the solution and any calcium compound which will dissolve to the extent necessary to provide such an amount of calcium, as by the yielding of calcium ions, for instance, may be employed as the additive. Usually there is no advantage in using more than about 2% calcium. Among the calcium compounds or precursors which can be employed in the present invention to provide calcium are the bases, calcium oxide and hydroxide, inorganic salts such as calcium nitrate, chloride, sulfate, bisulfate, etc. and organic salts such as calcium acetate, glutamate and so forth.

The MSG-containing solution is generally an aqueous solution with a pH generally of about 6.5 to 8.0 and preferably from about 6.8 to 7.2 at the time of crystallization. It can be prepared by converting glutamic acid, derived from a fermentation medium and in an aqueous slurry, to MSG by providing sodium ions in the slurry, for instance by the addition of NaOH to the slurry. The MSG so formed dissolves in the water to form an aqueous solution which is adjusted, by the addition of a basic compound e.g. NaOH, to a pH preferably from about 6.1 to 6.3. The calcium can then be provided in the solution, for instance, by the addition of CaO to the solution. If a basic calcium compound e.g. CaO, is used, the pH may rise to about 6.2 to 6.4. To adjust the pH to a pH of about 6.8 to 7.2 which is preferable for crystallizing MSG, additional amounts of basic sodium compounds e.g. NaOH, can be added.

The MSG-containing solution is supersaturated to crystallize MSG. Supersaturation of an MSG solution employed in connection with the present invention can be effected in any suitable manner. For instance, water can be removed (e.g. evaporated) from the solution to supersaturate the solution.

The following examples of the method of this invention are illustrative only and should not be considered limiting. The MSG solution used in the examples was formed at 50° C. with water and 99+% pure monosodium glutamate derived from a fermentation medium. The starting solution contained about 50% by weight of MSG.

*Example I*

To 200 g. of the MSG solution described, in a 250 ml. Erlenmeyer flask at 50° C., was added 0.50 g. CaO (0.36% Ca). The flask was sealed and placed on a "wrist action shaker" where it was allowed to agitate until crystals formed and the temperature was about 24–28° C. The crystal slurry was filtered and the crystals washed with a mixture of ethanol and water. The dry crystals were examined under a microscope and they had a length to diameter ratio of about 1/1 to 4/1 with most being about 2.5/1.

The run was repeated, except CaO was omitted. MSG crystals from this run had a length to diameter ratio of about 10/1 to 15/1.

*Example II*

This run was conducted exactly as was Example I, except 0.50 g. of monocalcium glutamate (about 0.1% Ca) was added to 200 g. of the 50% MSG solution. The MSG crystals were about 2.5/1 ($L/D$).

*Example III*

This run also was exactly the same as I, except that 1.00 g. $Ca(NO_3)_2 \cdot 4H_2O$ (0.17% Ca) was added to 200 g. of the 50% MSG solution. The MSG crystals were about 2.5/1 ($L/D$).

*Example IV*

Again this run was the same as I, except 0.65 g. $Ca(OH)_2$ (0.35% Ca) was added to 200 g. of the 50% MSG solution. The MSG crystals were about 2.5/1 ($L/D$).

*Example V*

In this example, the apparatus used consisted of a 2-neck liter flask, having an outlet with stopcock at the bottom for taking off crystal slurry. The aqueous feed solution was added continuously in one neck from a dropping funnel and the other neck was connected through a water condenser to a vacuum source. The temperature was maintained at 50° C. to 55° C. and the pressure was reduced to 100 mm. Hg within the flask to evaporate water. The feed was 2 liters of a 40% by weight aqueous solution of MSG in which had been dissolved about 9.8 g. of CaO (0.72% Ca). About 900 ml. of this solution was poured into the flask before the run began and the balance of the solution was added slowly through a dropping funnel while the material in the crystallizer was concentrated at about 50–55° C. and about 100 mm. Hg. The rate of feed addition and water removal was regulated to maintain a constant operating level in the crystallizer. Agitation was obtained by bleeding air into the bottom of the crystallizer. An MSG crystal slurry was removed periodically and filtered. The crystals were washed first with ethanol-$H_2O$ 1/1, then with ethanol-$H_2O$ 2/1, followed with ethanol-$H_2O$ 3/1, and finally with straight ethanol. After drying, the crystals were examined under the microscope. The length to diameter ratio was about 1/1 to 4/1 with most being about 2/1.

This run was repeated except CaO was omitted. The MSG crystals had a length to diameter ratio of about 10/1 to 15/1.

Example VI

The run of Example V was repeated again using 5.00 g. CaO (0.37% Ca) in 2 l. of the 40% MSG solution. The MSG crystals had a length to diameter ratio of about 3/1.

Example VII

The run of Example V was repeated except 6.50 g. $Ca(OH)_2$ (0.35% Ca) in 2 l. of 40% (wt.) MSG solution was used. The MSG crystals had an $L/D$ ratio of about 2.5/1.

Example VIII

An MSG solution can be prepared and the present invention can be practiced by the following procedure.

A sufficient amount of water is added to 700 grams of glutamic acid in a vessel to form a slurry. A 50% solution of sodium hydroxide is added to the slurry to convert glutamic acid to MSG and provide a solution with a pH of 6.1 to 6.3. 2.67 grams of CaO are added to the solution followed by the addition of more NaOH solution to provide a resulting solution with a pH of 6.8 to 7.2, and water is then added to provide an MSG solution with a volume of 2000 mls.

The solution is heated to evaporate water and supersaturate the solution, and the solution is agitated and cooled to crystallize MSG to provide MSG crystals with an $L/D$ ratio of about 2.5/1.

Example IX

The run is conducted essentially in the same manner as the run in Example I except calcium sulfate is used instead of CaO.

It can thus be seen that the method of this invention provides for alteration of the crystal properties of monosodium glutamate crystallized from an aqueous solution.

It is claimed:

1. In a method for the production of monosodium glutamate crystals from a solution of said salt by causing said solution to be supersaturated with respect to monosodium glutamate to crystallize the monosodium glutamate, the improvement which comprises crystallizing monosodium glutamate in the presence of a calcium compound capable of yielding a sufficient amount of calcium ion in the solution to change the crystal habit of the monosodium glutamate crystals.

2. The method of claim 1 wherein the amount of calcium is from about 0.01 to 2% based on the dry monosodium glutamate in solution and the solution has a pH from about 6.5 to 8.

3. In a method for the production of monosodium glutamate crystals from an aqueous solution of said salt by causing said solution to be supersaturated with respect to monosodium glutamate to crystallize the monosodium gluatmate to crysallize the monosodium glutamate, the improvement of a method for changing the crystal habit of said monosodium glutamate to decrease the length-to-diameter ratio of said crystals which comprises crystallizing monosodium glutamate in the presence of an amount of calcium ion in the solution sufficient to provide monosodium glutamate crystals having a length-to-diameter ratio no greater than about 8/1.

4. The method of claim 3 wherein the solution has a pH from about 6.5 to 8.

5. The method of claim 3 wherein the calcium ion is provided in the solution by a soluble calcium compound.

6. The method of claim 5 wherein the calcium compound is calcium oxide.

7. The method of claim 5 wherein the compound is calcium hydroxide.

8. The method of claim 5 wherein the compound is calcium nitrate.

9. The method of claim 5 wherein the compound is calcium glutamate.

10. The method of claim 5 wherein the compound is calcium sulfate.

11. In a method for the production of monosodium glutamate crystals from a solution of said salt by causing said solution to become supersaturated with respect to monosodium glutamate to crystallize the monosodium glutamate, the improvement consisting essentially of a method for changing the crystal habit of monosodium glutamate to vary the length-to-diameter ratio thereof and produce crystals having a low length-to-diameter ratio comprising crystallizing said monosodium glutamate in the solution in the presence of an effective amount of calcium ion for changing the crystal habit of monosodium glutamate.

References Cited by the Examiner

UNITED STATES PATENTS 2,306,646   12/42   Shiloneck _____ 260—534

LORRAINE A. WEINBERGER, *Acting Primary Examiner.*

LEON ZITVER, *Examiner.*